United States Patent
Pinnamaneni et al.

(10) Patent No.: US 12,499,897 B2
(45) Date of Patent: Dec. 16, 2025

(54) SYSTEM AND METHOD FOR AUTHENTICATION OF PROCESSED AUDIO FILES

(71) Applicant: Mastercard International Incorporated, Purchase, NY (US)

(72) Inventors: Venkata Satya Sivajee Pinnamaneni, Dardenne Prairie, MO (US); Sachin Kumar Singh, Pune (IN); Kaushal Shetty, Thane (W) Maharashtra (IN)

( * ) Notice: Subject to any disclaimer, the term of this patent is extended or adjusted under 35 U.S.C. 154(b) by 53 days.

(21) Appl. No.: 17/935,987

(22) Filed: Sep. 28, 2022

(65) Prior Publication Data

US 2024/0105183 A1    Mar. 28, 2024

(51) Int. Cl.
| | |
|---|---|
| *G10L 17/06* | (2013.01) |
| *G10L 17/02* | (2013.01) |
| *G10L 17/04* | (2013.01) |
| *H04L 9/32* | (2006.01) |
| *G10L 17/18* | (2013.01) |

(52) U.S. Cl.
CPC .............. *G10L 17/06* (2013.01); *G10L 17/02* (2013.01); *G10L 17/04* (2013.01); *H04L 9/3242* (2013.01); *G10L 17/18* (2013.01)

(58) Field of Classification Search
CPC ......... G10L 17/06; G10L 17/02; G10L 17/04; H04L 9/3242
USPC .................... 704/227–228, 231, 246, 251
See application file for complete search history.

(56) References Cited

U.S. PATENT DOCUMENTS

| | | | |
|---|---|---|---|
| 2015/0269363 A1* | 9/2015 | Marshall ............... | G06F 21/121 726/28 |
| 2023/0224147 A1* | 7/2023 | Pettit .................... | H04L 9/3239 380/44 |

* cited by examiner

*Primary Examiner* — George C Monikang
(74) *Attorney, Agent, or Firm* — Kristin Grant; Grant Attorneys at Law PLLC (57) ABSTRACT

An audio file authentication system configured to extract a plurality of audio features for a plurality of raw audio files containing a digital recording of a specific user's voice, provide an authenticated audio file that includes a digital recording the specific user's voice based on the authentication information for the specific user, generate a parent hash key and sequential child hash keys that are unique to the authenticated audio file, and generate a processed audio file in which the parent hash key and each of the sequential child hash keys is inserted sequentially as data within the audio gaps of the audio file.

11 Claims, 6 Drawing Sheets

SYSTEM AND METHOD FOR AUTHENTICATION OF PROCESSED AUDIO FILES

FIELD

This application relates to a system and method for authentication of processed audio files and, more specifically, to a system and method for authentication of audio files to be published using artificial intelligence-based models trained and implemented on a sonic engine computing system, the audio files including a digitally recorded voice such as an announcement.

BACKGROUND

There is a trend of publishing announcements using audio or video recorded sessions. These publications may occur on several platforms, including Twitter, LinkedIn, and other known platforms. Along with this trend, there has been a corresponding increase in voice-based authentication fraud. Specifically, there has been an increase in the copying and cropping of an individual's published audio clips to replicate voice-based transaction authorizations. As a result, there has been an increase in identity fraud for the specific purpose of gaining voice-based authentication of payment transactions. Accordingly, protecting and authenticating an individual's published audio files is necessary.

SUMMARY

An audio file authentication system is provided to protect and authenticate an individual's published audio files. The audio file authentication system configured to extract a plurality of audio features for a plurality of raw audio files containing at least a digital recording of a voice of a specific user, provide an authenticated audio file by authenticating that an audio file including a digital recording of the voice of the specific user based on the plurality of audio features and authentication information for the specific user, generate a parent hash key unique to the authenticated audio file, generate sequential child hash keys based on the parent hash key, a number of generated sequential child hash keys equal to the number of audio gaps in the authenticated audio file minus one, and generate a processed audio file in which the parent hash key and each of the sequential child hash keys is inserted sequentially as data within the audio gaps of the audio file.

The audio file authentication system may be further configured to input the raw audio files associated with the specific user into a trained audio features extraction model and obtain a plurality of extracted audio features for the specific user outputted by the trained audio features extraction model.

The audio file authentication system may be further configured to input the audio file as well as the audio features and the authentication information for the specific user into a trained audio file verification model and obtain a probabilistic authentication from the trained audio file verification model that the audio file comprises a digital recording of the voice of the specific user.

BRIEF DESCRIPTION OF THE DRAWINGS

The drawings described below are for illustrative purposes only and are not necessarily drawn to scale. The drawings are not intended to limit the scope of the disclosure in any way. Wherever possible, the same or like reference numbers are used throughout the drawings to refer to the same or like parts.

DETAILED DESCRIPTION

As mentioned above, this application relates to a system and method for authentication of processed audio files.

Figure 1:
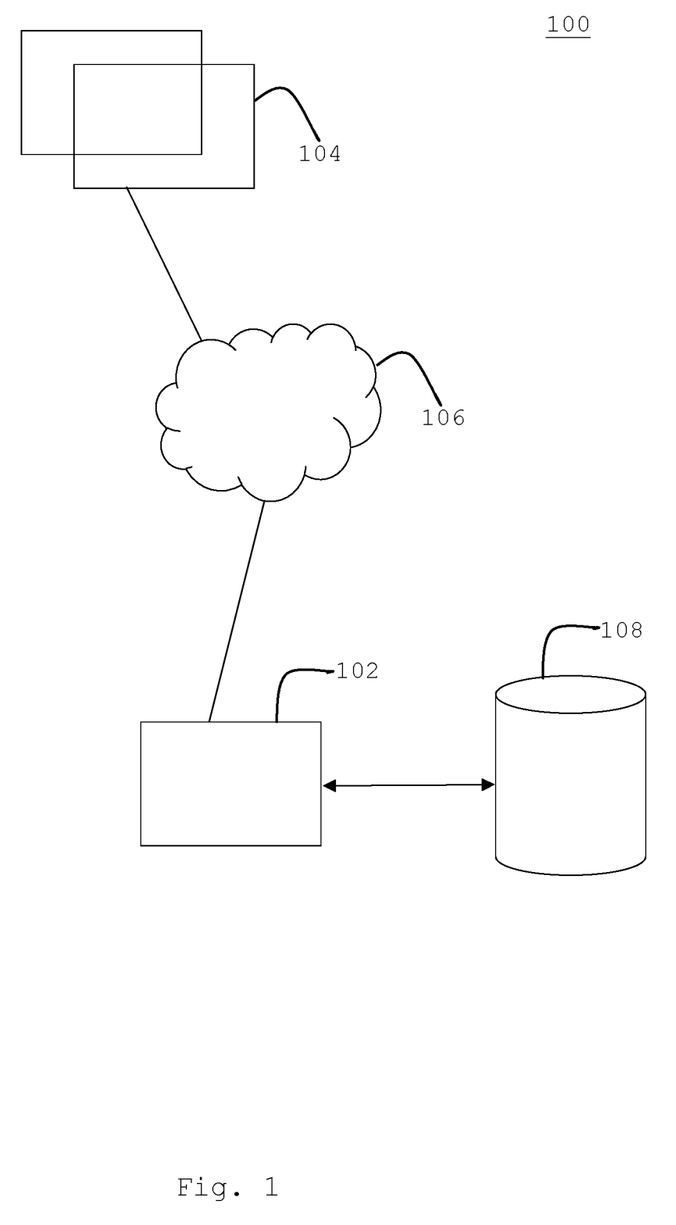
FIG. 1 is a block diagram of an audio file authentication system according to the embodiments disclosed herein.

FIG. 1 is a block diagram of an audio file authentication system 100 according to the embodiments disclosed herein. As shown in FIG. 1, the audio file authentication system 100 may include a sonic engine computing system 102 electronically connected to a plurality of user devices 104 over a network 106. The audio file authentication system 100 may further include a database 108 in electronic communication with the sonic engine computing system 102.

The sonic engine computer system 102 may include any suitable processor-based computing devices, such as one or more server or cloud-based computing systems. Specifically, the sonic engine computer system 102 may include one or more computing systems comprising at least one processor and supporting architecture.

The sonic engine computer system 102 implements applications that provide for the processing and authentication of audio files to be published. These applications may include the training and execution of an audio features extraction model that is an artificial intelligence-based model. These audio parameters may include voice modulation, wavelength, speech speed, pauses during speaking, or any other voice-based audio characteristics. A benefit of implementing the artificial intelligence-based audio features extraction model is its ability to dynamically define, identify, and update those audio parameters that are most effective in helping to authenticate audio files to be published.

These applications may further include an artificial intelligence-based audio file verification model. The audio file verification model provides a probabilistic authentication for an audio file to be processed for subsequent publication based on a previously defined set of extracted audio features stored on the database 108 for the user. A benefit of implementing the artificial intelligence-based audio file verification model is its ability to provide for changes in audio parameters resulting from age. Specifically, audio parameters may change with age, thereby lowering the authentication accuracy for an audio clip recorded during a later age range based on audio parameters extracted during an earlier age range. The audio file verification model may increase the accuracy of its probabilistic authentication by dynamically training it to compensate for age-based changes to extracted audio parameters. The audio file verification model may further increase the accuracy of its probabilistic authentication by dynamically training it to compensate for extraneous surrounding noise that may be present in an audio clip to be published.

These applications may further include an artificial intelligence-based hash key encoding model. The hash key encoding model provides for the dynamic generation of a hash key array based on a master key and its insertion at specific time frames within an audio clip to the published. The hash encoding model may also provide for the extraction of a hash key array from a processed audio clip for authentication purposes. A benefit of implementing the artificial intelligence-based hash key encoding model is its ability to dynamically identify appropriate spaces within an audio clip in which to embed a hash key array.

The plurality of user devices 104 provides users (not shown) access to the sonic engine computer system 102 over the network 106. Each of the plurality of user devices 104 may be any computing device capable of electronically connecting to the network 106, including a smartphone, a tablet, a laptop, or a computer system. As an example, the plurality of user devices 104 may include portable devices such as a laptop, a tablet, a smartwatch, personal digital assistants (PDA), a smartphone, and the like. As another example, the plurality of user devices 104 may include a fixed device such as a desktop, a workstation, and the like.

In one implementation, the user (not shown) may utilize a specific one of the plurality of user devices 104 to transmit to the sonic engine computing system 102 over the network 106 audio files that are to be processed before publication and authenticated after publication.

The network 106 may include, without limitation, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

Entities within the audio file authentication system 100 may connect to the network 106 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols or any combination thereof.

The database 108 may include a single database, a plurality of separate databases, or both. Moreover, the database 108 may be located at a single location or multiple locations. FIG. 1 shows the database 108 accessible to the sonic engine computing system 102 over any direct communications link, including a local area network (LAN). Alternatively, the database 108 may be accessible to the sonic engine computing system 102 over any other network configuration known to a person of ordinary skill in the art.

The database 108 provides for the storage and searchable retrieval of data used to implement the claimed method for authentication of processed audio files. This data may include authentication information used by the sonic engine computing system 102 to authenticate users who subscribe to the audio file authentication system 100.

The data may further include raw audio files containing voice recordings of subscribing users that are used to train the audio feature extraction model implemented on the sonic engine computing system 102.

The data may further include extracted audio features for subscribing users that are used to train the audio clip verification model and to verify audio files that are to be processed for subsequent publication.

The data may further include processed audio files for each subscribing user that may be subsequently published.

Lastly, the data may further include sequential hash arrays used to authenticate each processed audio file.

The database 108 may further provide for the storage and searchable retrieval of artificial intelligence-based trained models implemented on the sonic engine computing system 102.

Figure 2:
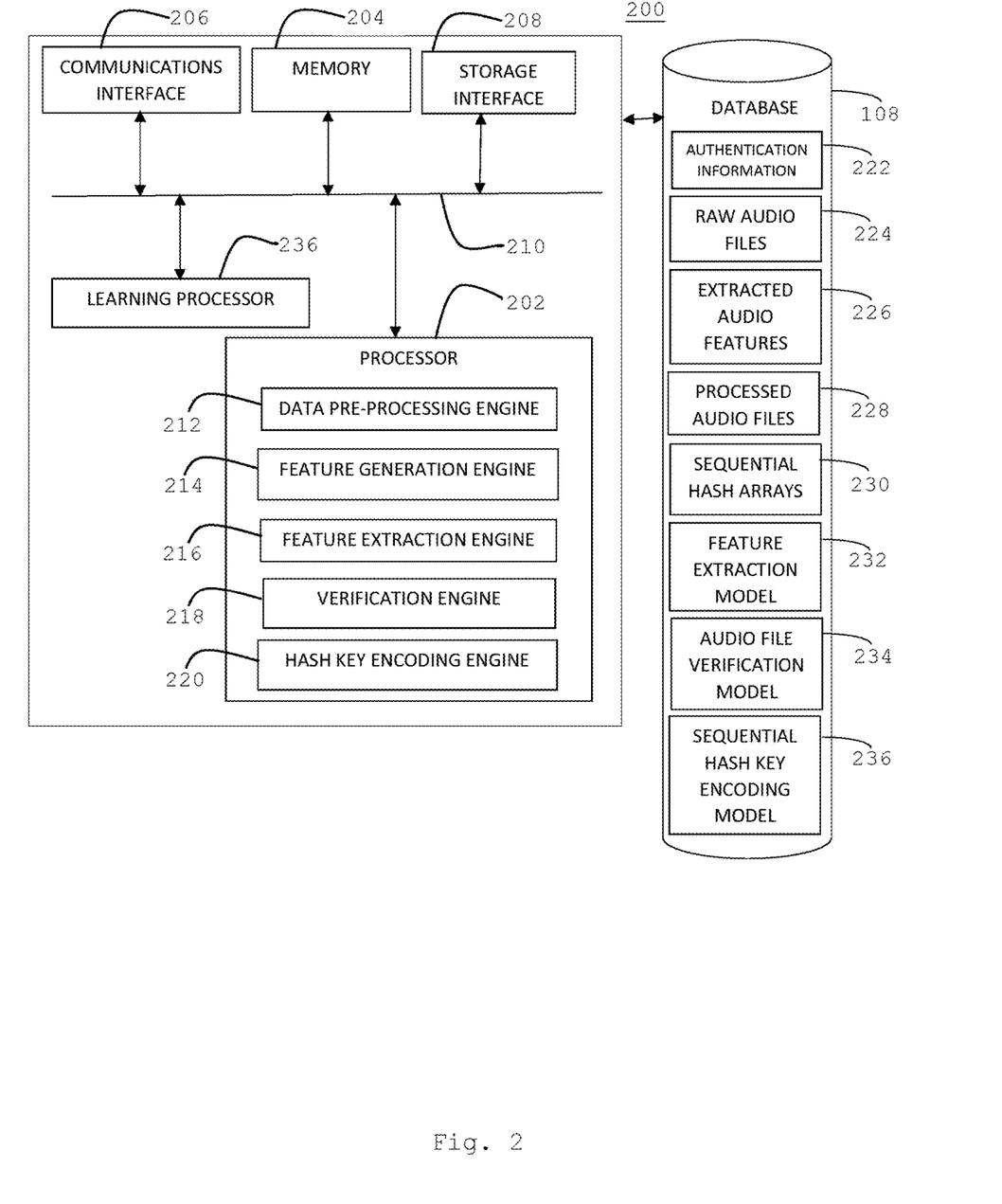
FIG. 2 is a block diagram of a sonic engine computing system according to the embodiments disclosed herein.

FIG. 2 is a block diagram of a sonic engine computing system 200 according to the embodiments disclosed herein. As shown in FIG. 2, the sonic engine computing system 200 includes at least one processor 202 for executing instructions, a memory 204, a communications interface 206 for communicating with the network 106, and a storage interface 208 for communicating with the database 108.

A common bus 210 enables all components within the sonic engine computing system 200 to communicate with one another. The at least one processor 202 is operatively coupled to the communication interface 206 via the common bus 210 to enable it to communicate with the plurality of user devices 104. Similarly, the at least one processor 202 is operatively coupled to the storage interface 208 via the common bus 210 to enable it to communicate with the database 108.

In the exemplary embodiment shown in FIG. 2, the at least one processor includes a data pre-processing engine 212, a feature generation engine 214, a feature extraction engine 216, a verification engine 218, and a hash key encoding engine 220. As will be apparent to a person of ordinary skill in the art, each of the components shown within the at least one processor 202 may be configured in a variety of ways, including electric circuitry, digital arithmetic and logic blocks, and a memory system in combination with software, firmware, and embedded technologies.

The data pre-processing engine 212 includes suitable logic and interfaces for accessing audio files, audio-related features, and authentication information stored on the database 108. In particular, the data pre-processing engine 212 may obtain authentication information 222 and raw audio files 224 for a specific user subscribing to the audio file authentication system 100. The authentication information 222 may include personal information on the specific user in addition to authentication information, including gender, ethnicity, location, age, preferences, and any other relevant information.

The raw audio files 224 stored on the database 108 are unformatted audio recordings that include at least a recording of the specific user's voice. The audio recordings of a specific user's voice will inherently include audio features characteristic of that specific user.

Accordingly, the authentication information 222 and the raw audio files 224 on the database 108 may include a plurality of indicators specific to each user subscribing to the audio file authentication system 100. The data pre-processing engine 212 is configured to perform operations on at least the authentication information 222 and the raw audio files 224 on the database 108, including data cleaning, normalization, and feature identification. As such, the data pre-processing engine 212 may acquire learning data for model learning and input data to be used when an output is acquired by using learning models.

The feature generation engine 214 includes suitable logic and interfaces for generating a plurality of audio features specific to a user subscribing to the audio file authentication system 100. More specifically, the feature generation engine 214 is configured to generate a plurality of user audio features based, at least in part, on the plurality of indicators derived from at least the authentication information 222 and the raw audio files 224 as operated on by the data pre-processing engine 212. In some embodiments, the user audio features, or other derived data may include but are not limited to keywords, frequency spectrum, modulation, amplitude, gender, age, location, and ethnicity information. As such, the feature generation engine 214 may configure the learning data and the input data acquired by the data pre-processing engine 212 for processing by the learning models.

The feature extraction engine 216 includes suitable logic and interfaces to provide a defined set of audio features specific to a user based on a user's personal information and raw audio files that include a recording of that user's voice. In particular, the feature extraction engine 216 is configured to implement an audio features extraction model 226 stored on the database 108. The audio features extraction model 226 is trained to provide a defined set of extracted audio features based on the raw audio files 224 stored on the database 108 for a specific user. Once outputted by the audio features extraction model 226, the extracted audio features 228 for the specific user are stored on the database 108.

The verification engine 218 includes suitable logic and interfaces to provide a probabilistic authentication of an audio file to be processed for subsequent publication based on a previously defined set of extracted audio features. In particular, the verification engine 218 is configured to implement an audio file verification model 230 stored on the database 108. The audio file verification model 230 is trained to provide a probabilistic authentication of an audio file to be processed for subsequent publication based on the set of extracted audio features 228 and authentication information 222 stored on the database 108 for a specific user. Probabilistic authentication assesses whether or not the audio file contains an authentic recording of the user's voice. The probabilistic authentication outputted by the audio file verification model 230 may be a numerical percentage or any other type of representation representative of the authenticity of the audio file.

The hash key encoding engine 220 includes suitable logic and interfaces to generate a hash key array and embeds the hash key array into an audio clip in preparation for publication. In particular, the hash key encoding engine 220 is configured to implement a sequential hash key encoding model 238 stored on the database 108. The sequential hash key encoding model 238 is trained to generate processed audio files from audio files that have been verified by the verification engine 218. In particular, the sequential hash key model 238 generates a sequential hash array 232 based on a parent key that is unique to each verified audio file. The sequential hash key model 238 stores the generated sequential hash array 232 in the database 108.

Once a sequential hash array 232 for a corresponding verified audio file has been generated, the sequential hash key encoding model 238 generates a processed audio file by embedding the sequential hash array 232 into specific time frames within the corresponding verified audio file. The sequential hash key encoding model 238 stores the processed audio file 234 in the database 108. The sequential hash key encoding model 238 is further trained to identify a sequential hash array 232 embedded within a processed audio clip and extract it for authentication purposes.

Accordingly, the authenticity of each processed audio file 234 stored on the database 108 may be verified subsequently to its publication based on its embedded sequential hash array. As such, a processed audio clip may be published on the Internet, including social media sites, while providing a means of verifying that its content has not been altered or manipulated.

Returning to the embodiment shown in FIG. 2, the sonic engine computing system 200 may include a learning processor 236. The learning processor 236 may refer to a device that trains an artificial neural network using a machine learning algorithm and implements a trained artificial neural network as a trained model. The learning processor 236 may train an artificial neural network using the learning data acquired by the data pre-processing engine 212 and configured by the feature generation engine 214.

An artificial neural network is a model used in machine learning and may refer to a whole model of problem-solving ability composed of artificial neurons or nodes that form a network by synaptic connections. In particular, the artificial neural network can be defined by a connection pattern between neurons in different layers, a learning process for updating model parameters, and an activation function for generating an output value.

Structurally, the artificial neural network may include an input layer, an output layer, and optionally one or more hidden layers. Each of these layers includes one or more neurons with synapses linking neurons to neurons between layers. Each neuron may represent an activation function that provides an output based on an input signal and different parameter types transmitted through the synapses.

Model parameters are determined through learning and may include a weight value for synaptic connections and deflections of neurons. Hyperparameters are set in the machine learning algorithm before learning and may include learning rate, repetition number, batch size, and an initialization function.

One of the goals of training an artificial neural network may be to determine the model parameters that minimize a loss function. This loss function is configured as an index to determine the optimal model parameters during the training process.

In the present embodiment, the learning processor 236 may use the authentication information 222, the raw audio files 224, extracted audio features 228, and processed audio files 234, as acquired and configured by the data pre-processing and feature generation engines 212 and 214, to train an artificial neural network. The resulting trained models may include the audio features extraction model 226, audio file verification model 230, and the sequential hash key encoding model 238.

Figure 3:
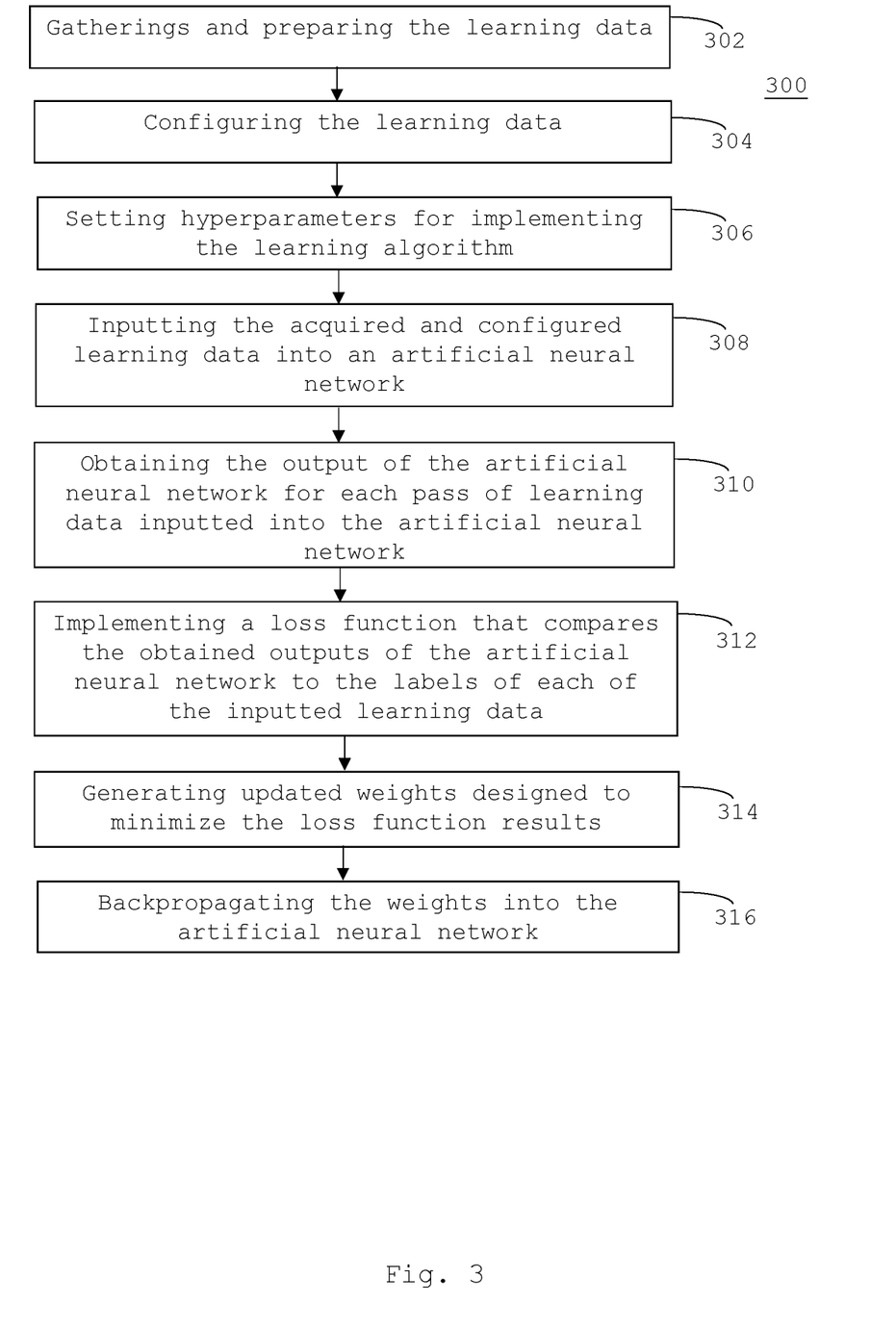
FIG. 3 is a flow diagram of a learning algorithm method for training the artificial intelligence-based models implemented on a sonic engine computing system according to the embodiments disclosed herein.

FIG. 3 is a flow diagram of a learning algorithm method for training the artificial intelligence-based models implemented on a sonic engine computing system 102 according to the embodiments disclosed herein.

The method 300 begins in step 302 with the sonic engine computing system 102 gatherings and preparing the learning data.

With reference to the audio features extraction model 226 in the presently disclosed embodiments, the learning data may include the raw audio files 224 in the database 108 that include voice recordings. Preparing the raw audio files 224 may include normalizing audio levels and file types and identifying those segments that include the voice recordings.

With reference to the audio features extraction model 226 in the presently disclosed embodiments, the learning data may include the user authentication information 222 in the database 108. Preparing the user authentication information may include normalizing and formatting each entry comprising a user's authentication information.

With reference to the sequential hash key encoding model 238 in the presently disclosed embodiments, the learning data may include the processed audio files 234 in the database 108. Preparing the processed audio files 234 may include ensuring that each of the processed audio files 234 includes an embedded hash array at defined time frames with the processed audio clip.

Once the learning data has been gathered and prepared, the method 300 continues in step 304 with the sonic engine computing system 102 configuring the learning data.

With reference to the audio features extraction model 226 in the presently disclosed embodiments, the configuration of the learning data may include identifying audio features to be extracted from each of the raw audio files 224 stored in the database 108, including keywords, frequency spectrum, voice modulation, wavelength, speech speed, pauses during speaking, and amplitudes information. The configuration of the learning data may include assigning a label to each raw audio file defining an expected output from the audio features extraction model 226 based on a raw audio file 224 input.

With reference to the audio file verification model 230 in the presently disclosed embodiments, the configuration of the learning data may include identifying the personal information to be acquired from authentication information 222 stored in the database 108, including gender, ethnicity, location, and preferences. The configuration of the learning data may include assigning a label to each combination of personnel information, previously extracted audio features, and sample audio files that define an expected output from the audio file verification model 226 based on this combination of inputs.

With reference to the sequential hash key encoding model 238 in the presently disclosed embodiments, the configuration of the learning data may include identifying a sequential hash array to be extracted from within each of the processed audio files 234 stored in the database 108. The configuration of the learning data may include assigning labels to each of the processed audio files 234 that define an expected output from the sequential hash key encoding model 238 based on a processed audio clip 234 input.

Once the learning data has been acquired and configured, the method 300 continues in step 306 with the sonic computing system 102 setting hyperparameters for implementing the learning algorithm.

The method 300 continues in step 308 with the sonic computing system 102 inputting the acquired and configured learning data into an artificial neural network.

The method 300 continues in step 310 with the sonic computing system 102 obtaining the output of the artificial neural network for each pass of learning data inputted into the artificial neural network.

As the outputs of the artificial neural network are obtained, the method 300 continues in step 312 with the sonic computing system 102 implementing a loss function that compares the obtained outputs of the artificial neural network to the labels of each of the inputted learning data.

The method 300 continues in step 314 with the sonic computing system 102 generating updated weights designed to minimize the loss function results.

Lastly, the method 300 ends in step 316 with the sonic computing system 102 backpropagating the weights into the artificial neural network.

The generation of updated weights and their backpropagation through the layers of the artificial neural network may be repeated a predefined number of times.

In an exemplary embodiment, the method 300 may be implemented by the learning processor 236.

Figure 4A:
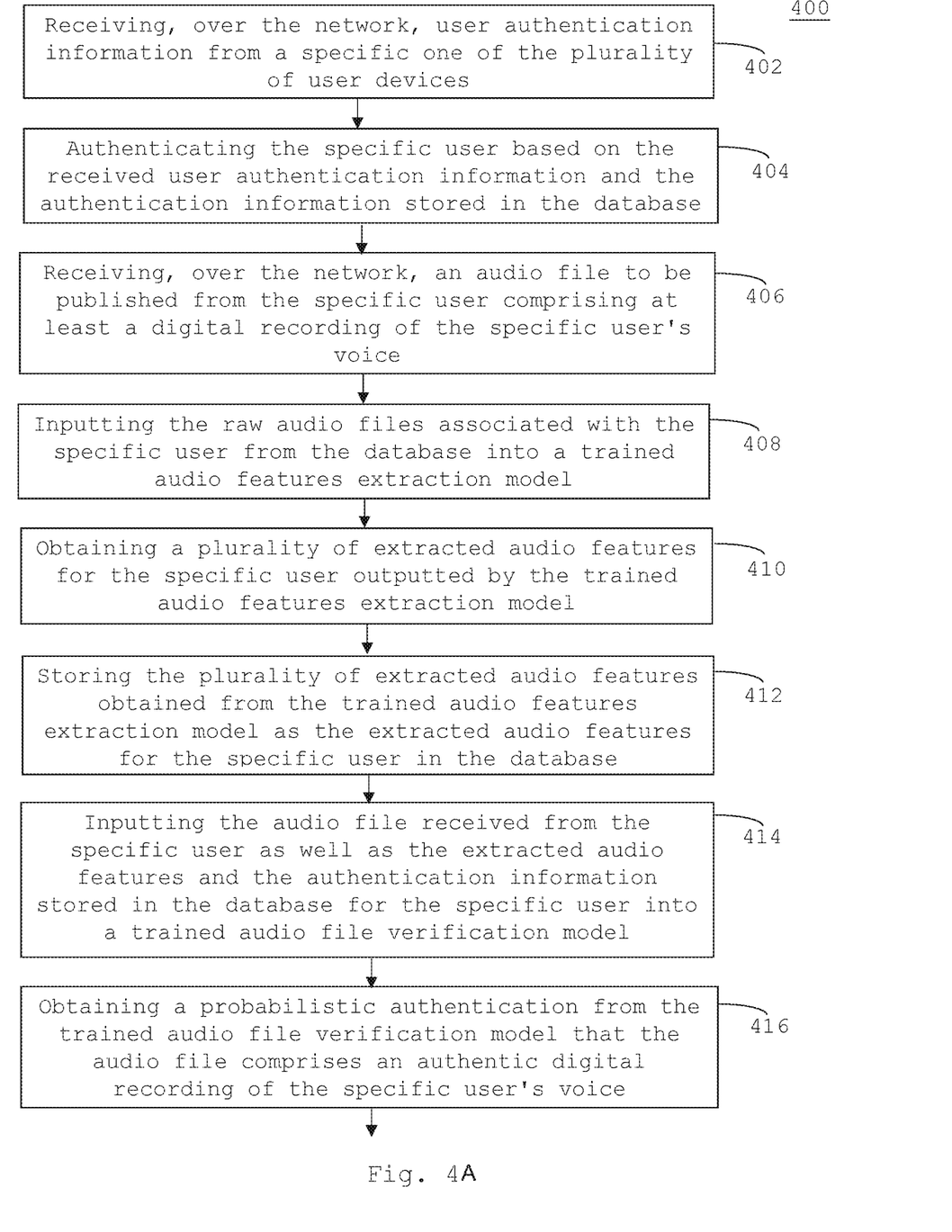
FIGS. 4A and 4B are a flow diagram of a method implemented on a sonic engine computing system for processing an audio file to be published according to the embodiments disclosed herein.
Figure 4B:
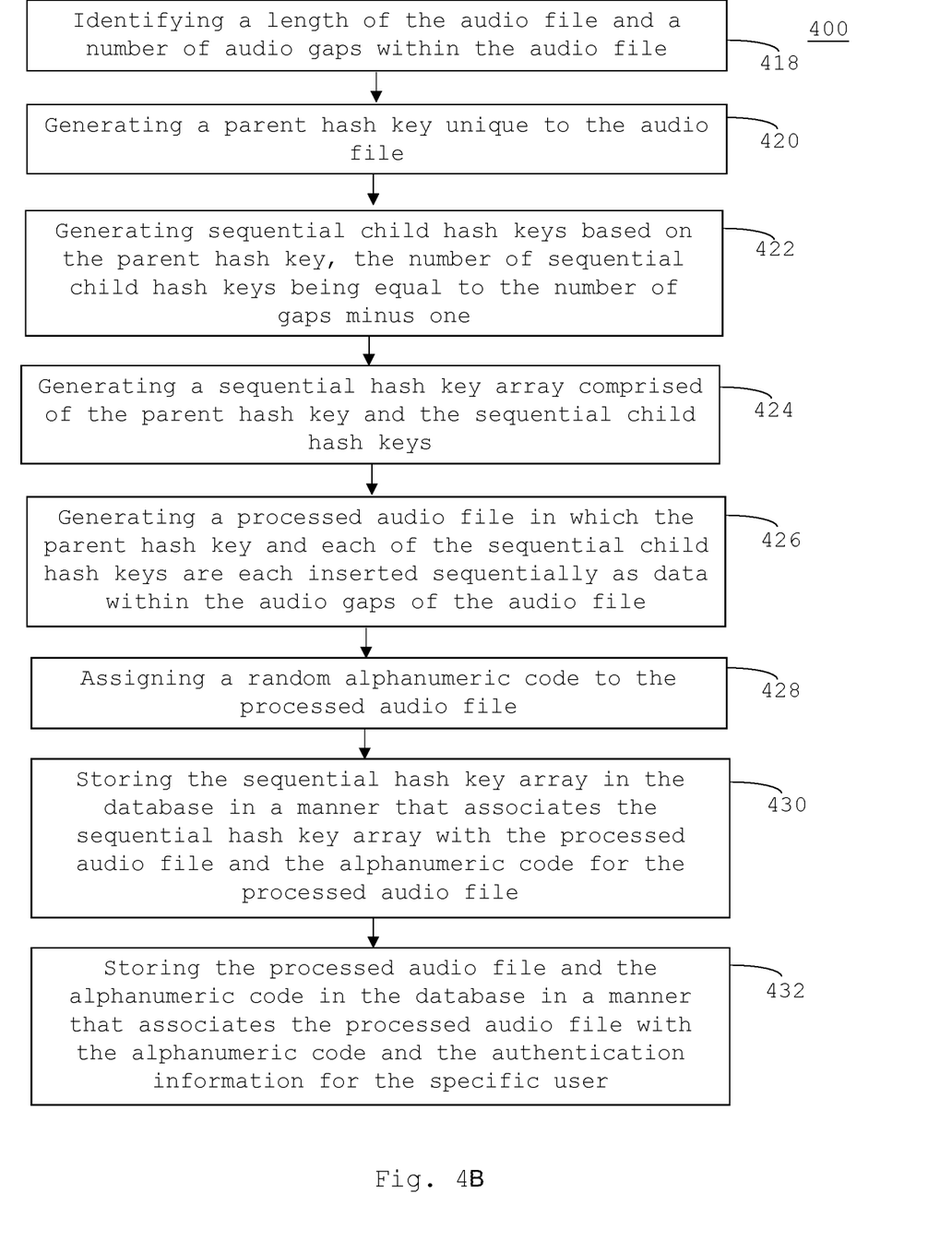

FIGS. 4A and 4B are a flow diagram of a method 400 implemented on a sonic engine computing system 102 for processing an audio file to be published according to the embodiments disclosed herein. The method 400 begins in step 402 with the sonic engine computing system 102 receiving, over the network 106, user authentication information from a specific user on one of the plurality of user devices 104.

The method 400 continues in step 404 with the sonic engine computing system 102 authenticating the specific user based on the received user authentication information and the authentication information 222 stored in the database 108.

Once the specific user is authenticated, the method 400 continues in step 406 with the sonic engine computing system 102 receiving, over the network 106, an audio file to be published from the specific user comprising at least a digital recording of the specific user's voice.

The method 400 continues in step 408 with the sonic engine computing system 102 inputting the raw audio files 224 associated with the specific user from the database 108 into a trained audio features extraction model 226.

The method 400 continues in step 410 with the sonic engine computing system 102 obtaining a plurality of extracted audio features for the specific user outputted by the trained audio features extraction model 226.

The method 400 continues in step 412 with the sonic engine computing system 102 storing the plurality of extracted audio features obtained from the trained audio features extraction model 226 as the extracted audio features 228 for the specific user in the database 108.

Once the extracted audio features have been obtained and stored in the database, the method 400 continues in step 414 with the sonic engine computing system 102 inputting the audio file received from the specific user as well as the extracted audio features 228 and the authentication information 222 stored in the database 108 for the specific user into a trained audio file verification model 230.

The method 400 continues in step 416 with the sonic engine computing system 102 obtaining a probabilistic authentication from the trained audio file verification model 230 that the audio file comprises an authentic digital recording of the specific user's voice.

Once it has been determined that the audio file from the specific user is authentic, the method 400 continues in step 418 with the sonic engine computing system 102 identifying a length of the audio file and a number of audio gaps within the audio file.

In an exemplary embodiment, the length of the audio file and a number of audio gaps within the audio file may be identified and obtained from the implementation of the sequential hash key encoding model 238.

The method 400 continues in step 420 with the sonic engine computing system 102 generating a parent hash key unique to the audio file.

In the exemplary embodiment, the parent hash key may be generated and provided by the sequential hash key encoding model 238. In one embodiment, the sequential hash key encoding model 238 may generate the parent hash key based on the previously obtained length of the audio file and the previously obtained number of audio gaps within the audio file.

The method 400 continues in step 422 with the sonic engine computing system 102 generating sequential child hash keys based on the parent hash key, the number of sequential child hash keys being equal to the number of gaps minus one.

In the exemplary embodiment, the sequential child hash keys are generated by the sequential hash key encoding model 238 based on the previously generated parent hash key.

The method 400 continues in step 424 with the sonic engine computing system 102 generating a sequential hash key array comprised of the parent hash key and the sequential child hash keys.

In the exemplary embodiment, the sequential hash key array comprised of the parent hash key and the sequential child hash keys may be generated by the sequential hash key encoding model 238.

The method 400 continues in step 426 with the sonic engine computing system 102 generating a processed audio file in which the parent hash key and each of the sequential child hash keys are inserted sequentially as data within the audio gaps of the recorded voice in the audio file.

In the exemplary embodiment, the processed audio file is generated by the sequential hash key encoding model 238 by the insertion of the previously generated parent and sequential child hash keys are inserted sequentially as data within the preciously identified audio gaps in the recorded voice in the audio file.

The method 400 continues in step 428 with the sonic engine computing system 102 assigning a random alphanumeric code to the processed audio file.

The method 400 continues in step 430 with the sonic engine computing system 102 storing the processed audio file and the alphanumeric code in the database 108 in a manner that associates the processed audio file 234 with the alphanumeric code and the authentication information 222 for the specific user.

Lastly, the method 400 ends in step 432 with the sonic engine computing system 102 storing the sequential hash key array in the database 108 in a manner that associates the sequential hash array 232 with the processed audio file 234 and the alphanumeric code for the processed audio file 234.

Figure 5:
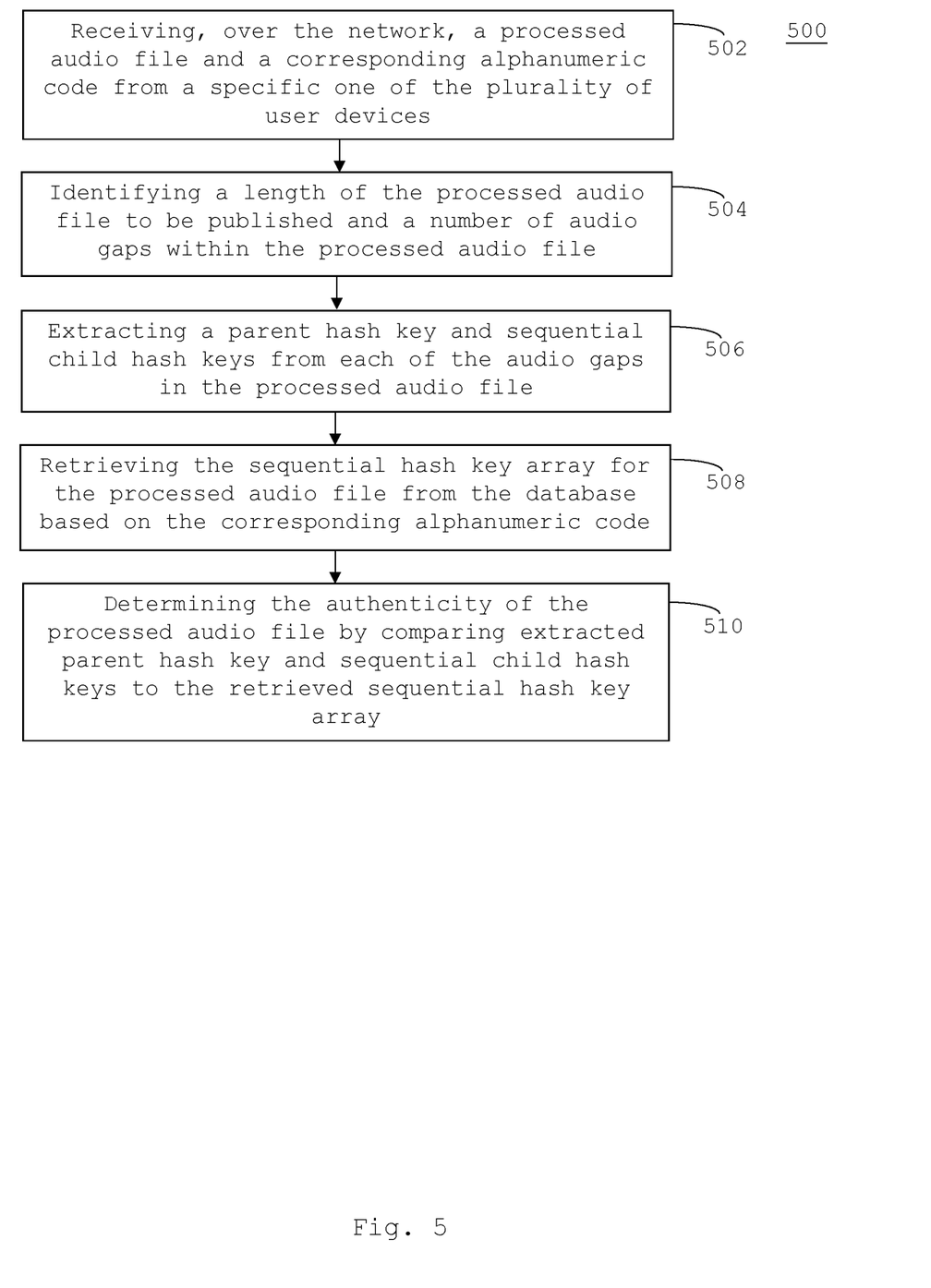
FIG. 5 is a flow diagram of a method implemented on a sonic engine computing system to authenticate a processed audio file according to the embodiments disclosed herein.

FIG. 5 is a flow diagram of a method 500 implemented on a sonic engine computing system 102 to authenticate a processed audio file according to the embodiments disclosed herein.

The method 500 begins in step 502 with the sonic engine computing system 102 receiving, over the network 106, a processed audio file and a corresponding alphanumeric code from a specific one of the plurality of user devices 104.

The method 500 continues in step 504 with the sonic engine computing system 102 identifying a length of the processed audio file to be published and a number of audio gaps within the processed audio file.

In an exemplary embodiment, the processed audio file is inputted into the sequential hash key encoding model 238 and the length of the processed audio file and the number of audio gaps within that processed audio file are identified by the sequential hash key encoding model 238.

The method 500 continues in step 506 with the sonic engine computing system 102 extracting a parent hash key and sequential child hash keys from each of the audio gaps in the processed audio file.

In the exemplary embodiment, the parent hash key and sequential child hash keys from each of the audio gaps in the processed audio file are identified and extracted by the sequential hash key encoding model 238.

The method 500 continues in step 508 with the sonic engine computing system 102 retrieving the sequential hash array 232 for the processed audio file from the database 108 based on the corresponding alphanumeric code.

In the exemplary embodiment, the sequential hash array 232 for the processed audio file is retrieved from the database 108 by the sequential hash key encoding model 238 based on the corresponding alphanumeric code.

Lastly, the method 500 ends in step 510 with the sonic engine computing system 102 determining the authenticity of the processed audio file by comparing extracted parent hash key and sequential child hash keys to the retrieved sequential hash array 232.

In the exemplary embodiment, the sequential hash key encoding model 238 determines the authenticity of the processed audio file by comparing extracted parent hash key and sequential child hash keys to the retrieved sequential hash array 232.

The foregoing description discloses only example embodiments. Modifications of the above-disclosed assemblies and methods which fall within the scope of this disclosure will be readily apparent to those of ordinary skill in the art.

This disclosure is not intended to limit the invention to the particular assemblies and/or methods disclosed, but, to the contrary, the intention is to cover all modifications, equivalents, and alternatives falling within the scope of the claims.

What is claimed is:

1. An audio file authentication system comprising:
at least one processor configured to:
  extract a plurality of audio features from a plurality of raw audio files containing at least a digital recording of a voice of a specific user;
  provide an authenticated audio file by authenticating an audio file that includes a digital recording of the voice of the specific user based on the plurality of audio features and authentication information for the specific user;
  identify a number of audio gaps within the recording of the voice of the specific user in the audio file;
  generate a parent hash key unique to the authenticated audio file;
  generate sequential child hash keys based on the parent hash key; and
  generate a processed audio file in which the parent hash key and each of the sequential child hash keys are inserted sequentially as data in the audio gaps within the recording of the voice of the specific user in the audio file.

2. The audio file authentication system of claim 1, wherein the at least one processor is further configured to:
  input the plurality of raw audio files containing at least a digital recording of a voice of a specific user into a trained audio features extraction model; and
  obtain a plurality of extracted audio features for the specific user outputted by the trained audio features extraction model.

3. The audio file authentication system of claim 1, wherein the at least one processor is further configured to:
  input the audio file as well as the audio features and the authentication information for the specific user into a trained audio file verification model; and
  obtain a probabilistic authentication from the trained audio file verification model that the audio file comprises a digital recording of the voice of the specific user.

4. The audio file authentication system of claim 1, wherein the at least one processor is further configured to:
input the authenticated audio file into a trained sequential hash key model; and
obtain the processed audio file from the trained sequential hash key model, the processed audio file including an embedded hash key array based on a parent key unique to the authenticated audio file.

5. The audio file authentication system of claim 1, wherein the plurality of audio features include keywords, frequency spectrum, modulation, and amplitudes information.

6. The audio file authentication system of claim 1, wherein the authentication information includes personal information that includes gender, ethnicity, location, and preferences.

7. An audio file authentication system comprising:
a sonic engine computing system comprising at least one processor;
a plurality of user devices, each of the plurality of user devices associated with a user that subscribes to the audio file authentication system;
a database configured to be in electronic communication with the sonic engine computing system and to store and retrieve user authentication information, raw audio files, extracted audio features, sequential hash key arrays, and processed user audio clips;
a network electronically connecting the plurality of user devices to the sonic engine computing device;
the at least one processor of the sonic engine computing system configured to:
receive, over the network, user authentication information from a specific one of the plurality of user devices;
authenticate a specific user using the user authentication information based on the user authentication information stored in the database;
receive, over the network, an audio file to be published from the specific user comprising at least a digital recording of a voice of the specific user;
input the raw audio files associated with the specific user from the database into a trained audio features extraction model;
obtain a plurality of extracted audio features for the specific user outputted by the trained audio features extraction model;
store the plurality of extracted audio features obtained from the trained audio features extraction model as the extracted audio features for the specific user in the database;
input the audio file from the specific user as well as the extracted audio features and the user authentication information stored in the database for the specific user into a trained audio file verification model;
obtain a probabilistic authentication from the trained audio file verification model that the audio file comprises a digital recording of the voice of the specific user;
identify a length of the audio file and a number of audio gaps within the audio file;
generate a parent hash key unique to the audio file;
generate sequential child hash keys based on the parent hash key, the number of sequential child hash keys being equal to the number of gaps minus one;
generate a sequential hash key array comprised of the parent hash key and the sequential child hash keys;
generate a processed audio file in which the parent hash key and each of the sequential child hash keys are each inserted sequentially as data within the audio gaps of the audio file;
assign a random alphanumeric code to the processed audio file;
store the processed audio file in the database in a manner that associates the processed audio file with the random alphanumeric code and the user authentication information for the specific user; and
store the sequential hash key array in the database in a manner that associates the sequential hash key array with the processed audio file and the random alphanumeric code for the processed audio file.

8. The audio file authentication system of claim 7 wherein the extracted audio features stored on the database include keywords, frequency spectrum, modulation, and amplitudes information.

9. The audio file authentication system of claim 7 wherein the user authentication information stored on the database includes personal information that includes gender, ethnicity, location, age, and preferences.

10. The audio file authentication system of claim 7 wherein the at least one processor of the sonic engine computing system is further configured to transmit, over the network, the processed audio file to the specific user on the specific one of the plurality of user devices.

11. The audio file authentication system of claim 7 wherein the at least one processor of the sonic engine computing system is further configured to:
receive, over the network, a processed audio file and a corresponding alphanumeric code from a specific one of the plurality of user devices;
identify a length of the processed audio file to be published and a number of audio gaps within the processed audio file;
extract a parent hash key and sequential child hash keys from each of the audio gaps in file audio;
retrieve from the database the sequential hash key array for the processed audio file based on the corresponding alphanumeric code; and
determine authenticity of the processed audio file by comparing extracted parent hash key and sequential child hash keys to the sequential hash key array retrieved from the database.

* * * * *